June 8, 1954
B. C. MILLER
2,680,497
GANG OF GREASE FITTING CAPS
Filed April 24, 1950
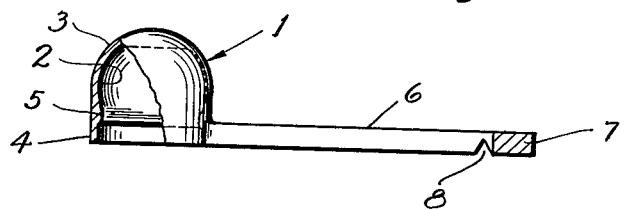
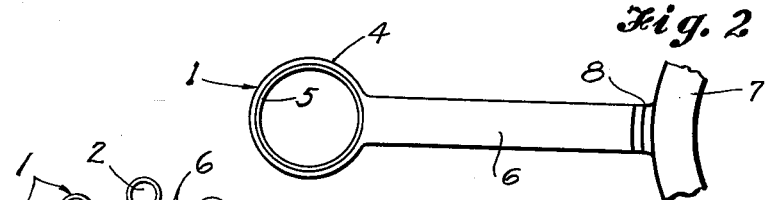
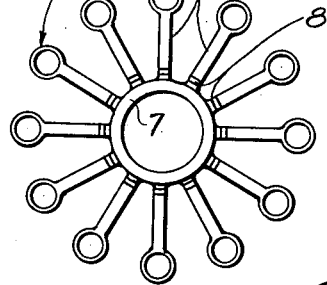
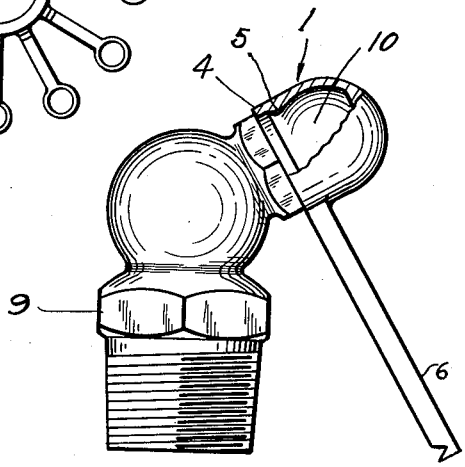
INVENTOR.
Bernard C. Miller
BY
Paul Bliven
ATTORNEY Patented June 8, 1954

2,680,497

UNITED STATES PATENT OFFICE 2,680,497

GANG OF GREASE FITTING CAPS

Bernard C. Miller, King County, Wash.

Application April 24, 1950, Serial No. 157,721

3 Claims. (Cl. 184—88)

The present invention relates to a grease fitting cap.

At the present time there is on the market a type of grease fitting that is in wide use in the automotive field. These fittings have a ball shaped portion that is adapted to be received in a ball-socket in a grease gun. Grease is delivered to the fitting thru aligned passageways in the ball-socket of the gun and the ball of the fitting. This procedure leaves the ball of the fitting coated with grease and the end of the passageway in the ball open. During service, dust, dirt, and sand collect on these greased surfaces. Wiping with a cloth will clean the outer surface of the ball but will not remove such foreign matter from the grease in the passageway opening. This foreign matter is then injected into the fitting and its related bearing when such is again lubricated.

In the greasing of such fittings on an automotive vehicle, there is no simple and reliable manner of checking or tallying the fittings greased to determine if one or more have not been serviced.

Having in mind these defects of the prior art, it is an object of the present invention to provide for grease fittings a simple cap that may be easily applied and removed, and which is of such low cost as to be disposable after each servicing of the fitting.

Another object of the present invention is the provision of a grease fitting cap that has a handle.

Another object of the present invention is the construction of a grease-fitting cap that is resilient and thereby non-frangible.

A further object of the present invention is the provision of a grease fitting cap that snaps into place on the ball of a fitting and is retained thereon by resilient pressure.

A still further object of the present invention is the forming of an assembly of such caps so that they may be easily handled and dispensed.

The above mentioned defects of the prior art are remedied and these objects achieved by forming a piece of plastic material in the form of a cup with a somewhat restricted mouth opening so that when the mouth of the cup is placed on the ball of a grease fitting it will require an appreciable pressure to force the restricted opening past the equator of the ball. Once forced on the ball, the restricted mouth retains the cup on the ball until the cup is forcibly removed. Secured to the rim of the cup is a handle. The cup and handle have, in miniature, the appearance of an old fashioned dipper or ladle.

A device made in accordance with this outline is hereinafter described in detail and shown in the accompanying drawings, in which:

Figure 1 is an elevational view, partly in section, of the cap forming the subject matter of the present disclosure and shown attached to a ring-like connecting member.

Figure 2 is a plan view related to Figure 1 with the connecting member shown fragmentarily.

Figure 3 is an elevational view of the cap as applied to a grease fitting, and with its handle broken from the connecting member.

Figure 4 is a plan view of one form of assembly of a plurality of such caps all joined to a ring-like connecting member.

The drawings show a cap consisting of a cup and handle that may be made out of one of several of the well known plastics used in the moulding of small articles. The cup 1 is hollow and spheroidal in shape, like a cup. The inner surface 2 of the cup is, largely, parallel to the outer surface 3. The edge 4, or rim, of the cup is formed as a cylindrical band. On the interior of the cup where the rim joins the inner spherical surface 3 there is formed an annular rib 5 or other restriction whose inside diameter is slightly less than the inside diameter of the inner spherical surface. This rib, or cup mouth restriction, may be formed by making the inner spheroidal surface slightly greater than a hemisphere, or by the placing of bumps along the inner edge of the cup mouth.

The handle 6 of the cap is made integral with the cup and is normal to the outer surface of the rim 4, as in a dipper or ladle. The outer end of the handle 6 is secured to some sort of a base such as a ring 7 so that a plurality of the caps may be secured together in a gang for sale or dispensing. The ring 7 and its attached gang of caps is shown in Figure 4. The shaping of the base into the form of a ring, gives a dispensing assembly that may be easily held by a mechanic as a grease job is being done on an automobile or other piece of machinery.

Near the juncture of the handle 6 and the ring 7, a notch 8 provides a portion of reduced cross-section interconnecting the end of the handle with the ring. This reduced portion allows the handle to be easily broken away from the ring at a place close to the ring without damage to the cup or handle.

Figure 3 shows the cap in place on a grease fitting 9. The grease fitting illustrated, has a head portion 10 shaped as a ball or cone or other form which is adapted to fit in a mating socket on a grease gun, or applicator. This ball 10 is the ball, or head, which the cup 1 is adapted to fit and to be retained on. The restricted opening of the cup formed by the rib 5 or other restrictions such as a series of bumps causes pressure to be exerted to snap the cup on the ball, and this rib retains the cup on the ball 10.

The dipper handle 6 not only serves as a means for securing the caps in a clip, in the manner of paper matches in a book, but, also, the severed handle stubs serve as a means for tallying the number of grease fittings serviced, and the handle attached to the cup aids in its removal from the grease fitting. Further, the caps may be supplied in various colors so that a different color may be used for each servicing of a grease fitting.

Very satisfactory caps have been made out of polyethylene. Vinyl chloride and other resins having characteristics similar to these two resins will make good and satisfactory caps. Caps made of these materials have the requisite resiliency and non-frangibility, and are impervious to petroleum greases and oils.

Having thus described my invention, I claim:

1. A gang of grease-fitting caps molded in one piece of a resilient material, said gang comprising a plurality of grease-fitting cup units each having a cup for covering a grease-fitting and a handle integral therewith, a connecting member having an opening therethrough, and portions of reduced cross-section interconnecting the cup units and the connecting member whereby the cup units can be easily detached one at a time.

2. The structure of claim 1 in which said connecting member is in the form of a ring and the cup units extend radially with respect thereto.

3. A gang of grease-fitting caps molded in one piece, said gang comprising a plurality of plastic grease-fitting cap units each having a cup for covering a grease-fitting and a handle integral therewith, each of said handles being separated from the others, a plastic connecting member, and portions of reduced cross-section interconnecting the ends of the handles and the connecting member whereby the handles can be easily detached one at a time.

References Cited in the file of this patent

UNITED STATES PATENTS

| Number | Name | Date |
| --- | --- | --- |
| 824,210 | Sauer | June 26, 1906 |
| 1,379,609 | Barry | May 31, 1921 |
| 1,583,019 | Simmons | May 4, 1926 |
| 2,139,291 | Topjian | Dec. 6, 1938 |
| 2,305,514 | Chandler | Dec. 15, 1942 |
| 2,379,529 | Kennedy | July 3, 1945 |
| 2,430,441 | Abramson | Nov. 11, 1947 |
| 2,530,888 | Marchelewicz | Nov. 24, 1950 |

FOREIGN PATENTS

| Number | Country | Date |
| --- | --- | --- |
| 535,616 | Great Britain | Apr. 16, 1941 |